Jan. 13, 1942.　　　　P. WHITCOMB　　　　2,270,098
VARIABLE SPEED POWER TRANSMISSION UNIT
Filed May 28, 1940　　　7 Sheets-Sheet 1
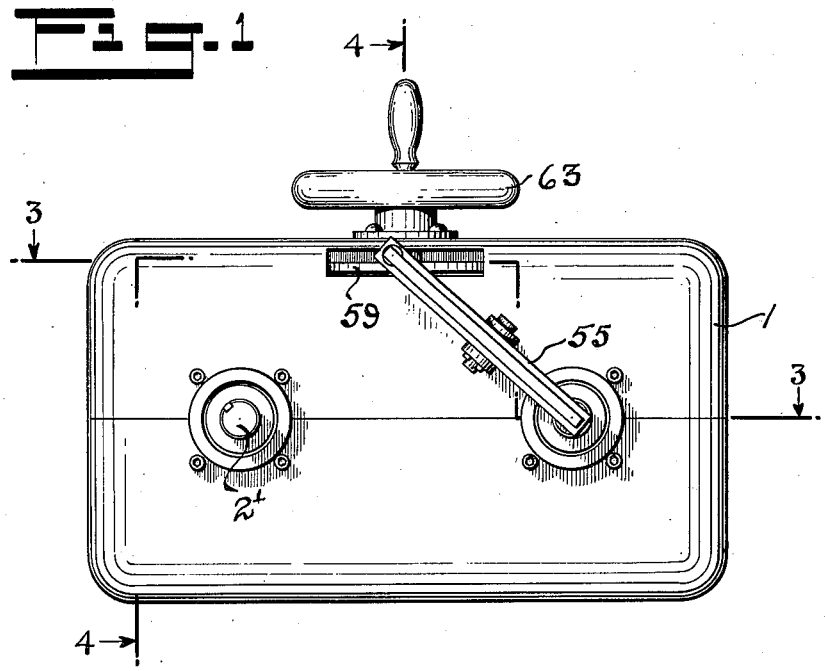
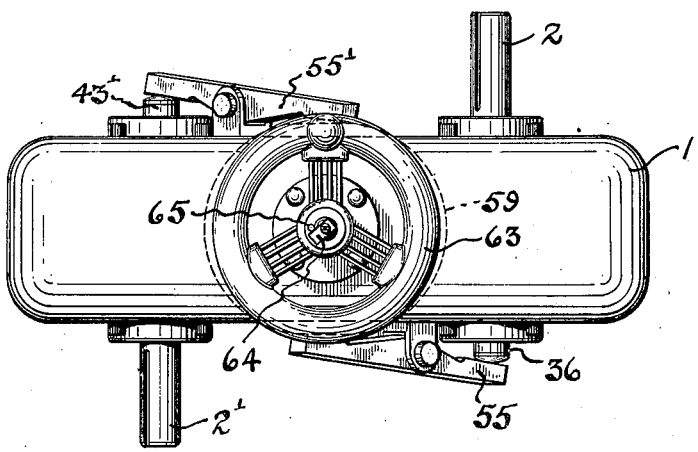
INVENTOR.
Preston Whitcomb
BY
Darby & Darby
Attorneys.

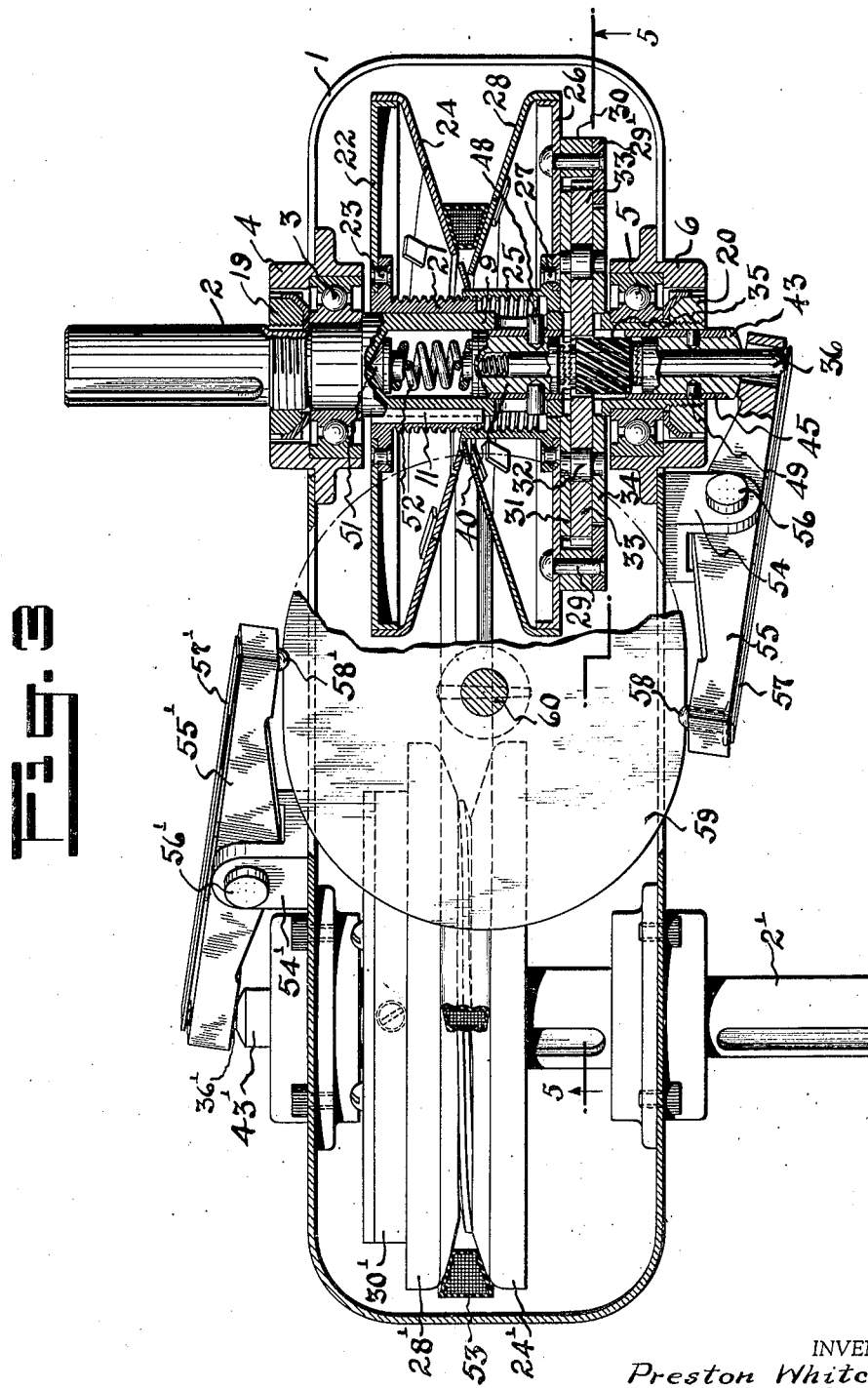

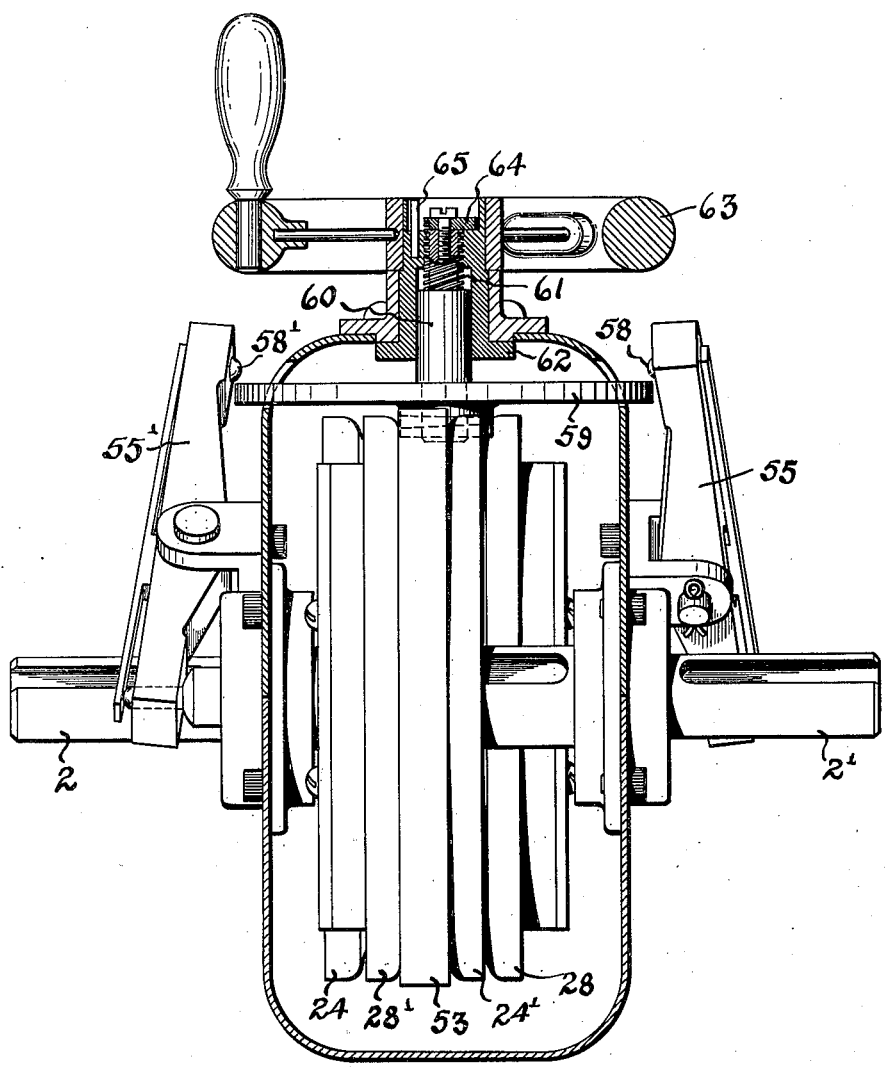

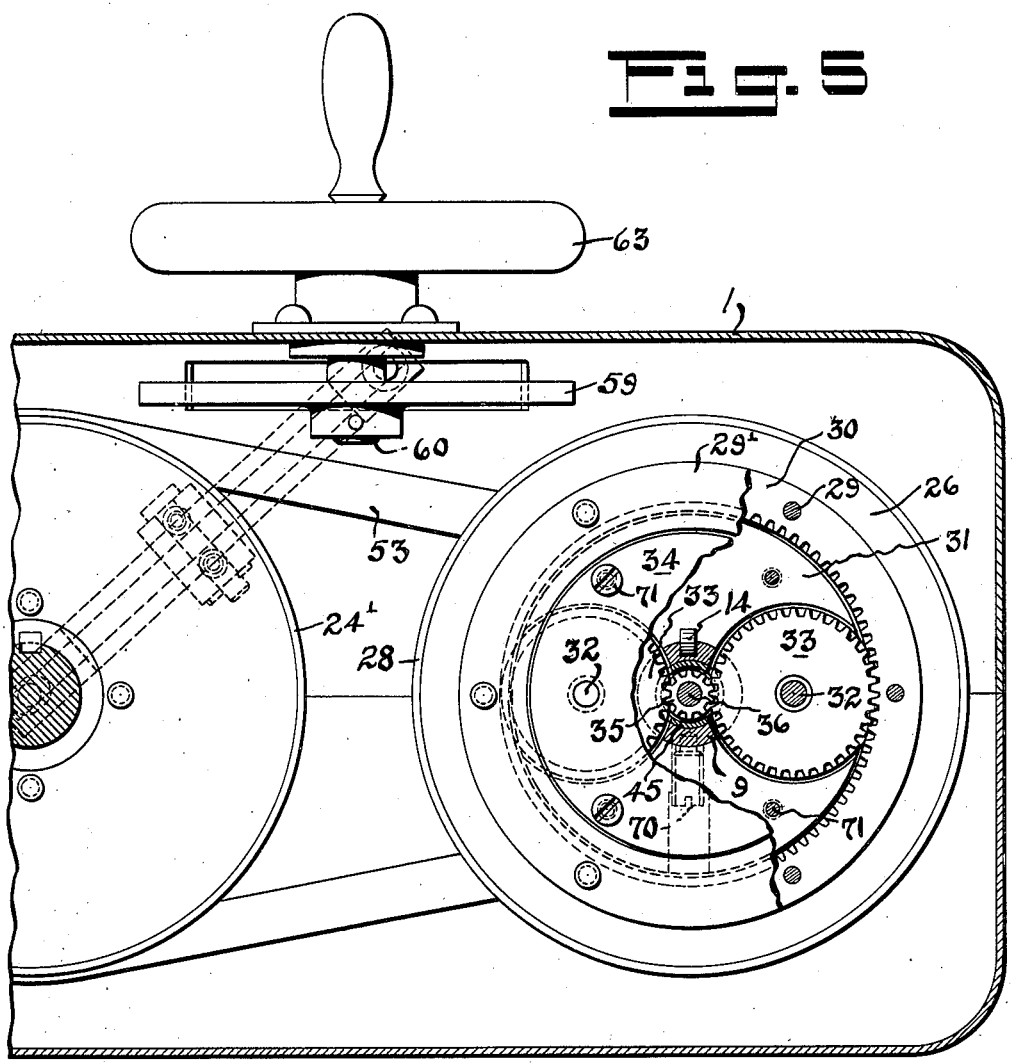
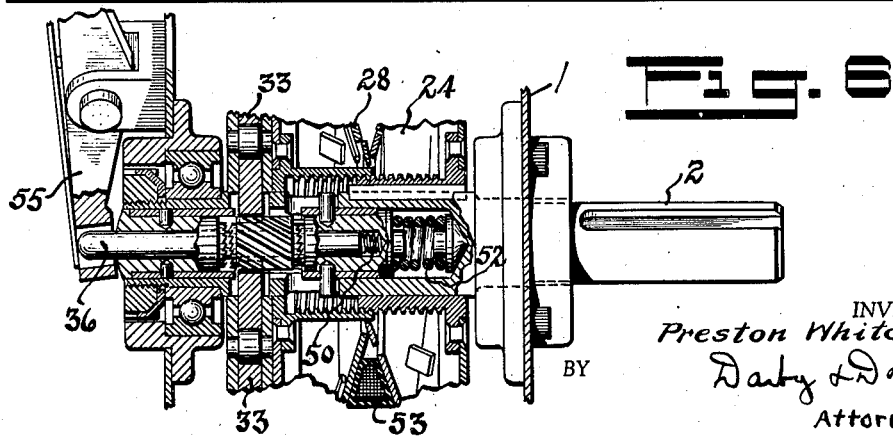

Jan. 13, 1942. P. WHITCOMB 2,270,098
VARIABLE SPEED POWER TRANSMISSION UNIT
Filed May 28, 1940 7 Sheets-Sheet 5
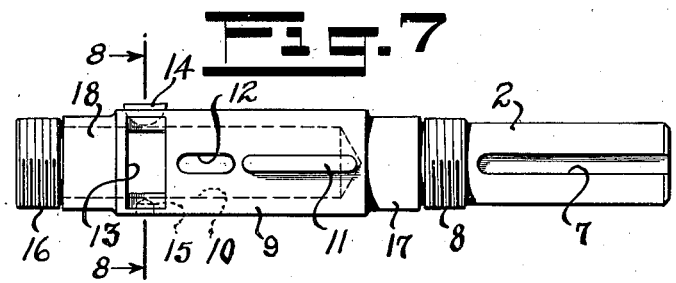
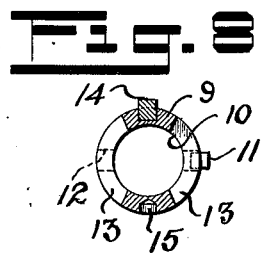
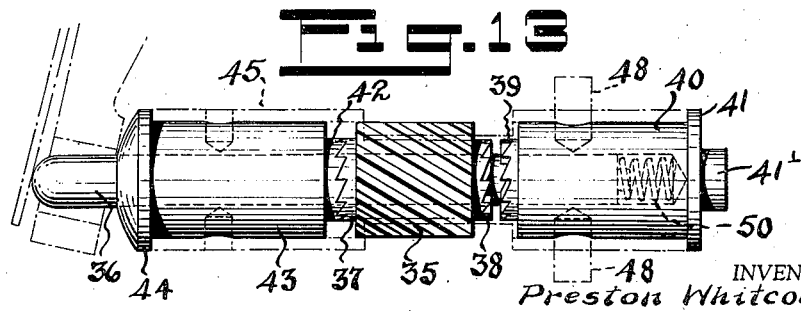
INVENTOR.
Preston Whitcomb
BY
Darby & Darby
Attorneys.

Jan. 13, 1942.                P. WHITCOMB                2,270,098
              VARIABLE SPEED POWER TRANSMISSION UNIT
                  Filed May 28, 1940           7 Sheets-Sheet 6

INVENTOR.
Preston Whitcomb
BY
Darby & Darby.
Attorneys.

Jan. 13, 1942.  P. WHITCOMB  2,270,098
VARIABLE SPEED POWER TRANSMISSION UNIT
Filed May 28, 1940  7 Sheets-Sheet 7

INVENTOR.
Preston Whitcomb
BY Darby & Darby
Attorneys.

Patented Jan. 13, 1942

2,270,098

UNITED STATES PATENT OFFICE 2,270,098

VARIABLE SPEED POWER TRANSMISSION UNIT

Preston Whitcomb, Bridgeport, Conn., assignor to Manning, Maxwell & Moore, Inc., New York, N. Y., a corporation of New Jersey Application May 28, 1940, Serial No. 337,613

18 Claims. (Cl. 74—230.17)

This invention relates to improvements in variable speed power transmission devices, of a type employing V-pulleys.

An important object of this invention is the provision of a device of the above type embodied in a single compact unit.

Another object of the invention involves the construction of a variable speed power transmitting device employing V-pulleys and a V-belt which is capable of adjustment throughout its range while running.

A more specific object of this invention is the provision of a combination as mentioned above employing, but not necessarily limited to the use of adjustable V-pulleys of the type disclosed in full detail in my United States Letters Patent No. 2,187,188, issued January 16, 1940.

A further object of this invention is the provision of a combination of the above type employing V-pulleys each of which comprises a pair of pulley parts which are relatively movable in an axial direction by adjustment relatively with circumferential motion.

It is a further object of the invention to provide adjusting mechanism for the above combination to effect relative axial adjustment of the pulley parts throughout their full range of adjustment, while running at any speed within its range.

The many additional and more detailed objects of this invention will be more clearly understood from the following detailed description when taken in connection with the attached drawings.

This invention resides substantially in the combination, construction, arrangement and relative location of parts, all in accordance with this disclosure.

In the accompanying drawings, wherein the same parts are designated by the same reference numerals throughout the several views, Figure 1 is a side elevational view of a unit in accordance with this invention;

Figure 2 is a top plan view thereof;

Figure 3 is a cross-sectional view taken on the line 3—3 of Figure 1;

Figure 4 is a cross-sectional view taken on the line 4—4 of Figure 1;

Figure 5 is a cross-sectional view taken on the line 5—5 of Figure 3;

Figure 6 is a view similar to that of Figure 3, with many parts broken away showing the mechanism in its other position with respect to the position shown in Figure 3;

Figure 7 is a side elevational view of one of the shafts employed in the device;

Figure 8 is a cross-sectional view taken on the line 8—8 of Figure 7;

Figure 9 is a side elevational view of the sleeve as employed with the clutch elements and shown in dash-dot lines in Figure 13;

Figure 10 is a longitudinal, central, cross-sectional view through one of the cam operated levers;

Figure 11 is a plan view of the planetary gear carrier;

Figure 12 is an edge elevational view thereof, partly broken away;

Figure 13 is an enlarged plan view of the clutch elements; and

Figure 14:
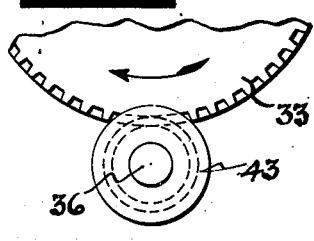
Figures 14 to 29 show different positions of the clutching mechanism.

In the form of the device illustrated in the drawings, to provide a basis for a description of one form of the invention herein disclosed, there are employed V-pulleys of the kind set forth and claimed in my above-mentioned patent. The structural features thereof, in addition to being set forth in full detail in that patent, are also illustrated in the drawings herein with sufficient detail so that the invention of this patent may be easily understood.

Briefly each pulley comprises two parts which are generally similar and in the form of truncated conical shells. The conical portion of each shell is sheared through along a spiral line so that as the parts move towards and away from each other in an axial direction, by reason of relative rotational movement, the spiral-shaped bands formed by the spiral shear lines interleave or overlap so that in effect the shells screw into each other to change the diameter of the V-belt groove, as is apparent from Figure 3.

The invention is more specifically concerned with manually controlled mechanism to effect the simultaneous approach and recession of the pulley parts of a pair of pulleys connected by a belt so that as the belt groove of one pulley increases in diameter the belt groove of the other pulley decreases in diameter in proportion.

At this point it may be well to note that, as will appear from the following description, the principles and structure of this invention are not limited to use with V-pulleys of the construction disclosed in the above mentioned patent. By using a wide V-belt as is sometimes employed, the invention herein disclosed can be employed to effect relative adjustment of the pulley parts of V-pulleys which, while moving relatively in an axial direction to effect adjustment, do not interleave or in any other way intersect. Thus there are adjustable V-pulleys where the pulley parts approach each other to the point of contact which represents the maximum groove diameter and can be moved apart from that position to the minimum groove diameter, see Patent No. 1,963,913 issued June 19, 1934. It goes without saying, as will be apparent from the following description, that this invention can be used with V-pulleys of the type where the pulley parts intersect, as in the case of those which are slotted, see Patent No. 1,350,670 issued August 24, 1920.

Referring now to the drawings, a detailed description of the embodiment selected to illustrate this invention will be undertaken.

As shown in several of the figures, the unit includes a case 1 of any suitable configuration and construction, preferably made in several parts so that access to the interior thereof may be had when necessary. There are provided a pair of shafts 2 and 2' of the same construction the details of which are shown in Figures 7 and 8. Shaft 2 is provided at one end with a key slot 7 to which may be keyed a gear, pulley, or other device to effect rotation thereof, or by which the device to be driven may be operated. Adjacent this end of the shaft is a short threaded section 8 and a short cylindrical section 17. The next portion 9 of the shaft is of slightly larger diameter and is counterbored to form a chamber 10 as illustrated.

In this portion is provided a key 11 and a pair of slots 12 extending through the wall formed by the counterbore. Extending transversely of the slots 12 are a pair of openings 13 likewise formed in the wall resulting from the counterbore. Positioned between the slots 13, on one side of the shaft, is a key 14 and on the other side is a shallow recess 15. The next portion of the shaft consists of a cylindrical part 18 and a terminal portion 16, externally threaded as shown.

At this point it may be noted that the construction of the two halves of the device (see Figure 3) is the same, with the result that only one half is shown in the cross-section, the other half being shown in elevation. For this reason no further reference will be made to the other part until a description of the operation is given.

Shaft 2 is journaled in the ball bearings 3 and 5, which are mounted in the housings 4 and 6 respectively. These housings are attached to the main casing 1 in any suitable manner. The inner races of the ball bearings 3 and 5 are mounted on cylindrical portions 17 and 18, respectively, of the shaft. The shaft is held in axial position by means of threaded collars 19 and 20 which engage the threaded portions 8 and 16, respectively, of the shaft.

At 21 is an externally threaded sleeve which fits on the portion 9 of the shaft to which it is splined by means of the key 11 (see Figure 3). The outer end of the sleeve 21 is flanged and is attached by means of rivets 23 to a flanged disc 22 which closes the open end of the truncated shell 24 forming one of the pulley halves. The conical portion of this shell, as explained before, is sheared on a spiral line (Figure 3). A somewhat similar sleeve 25 is provided which in this case is internally threaded for cooperation with the external threads on the sleeve 21. The flange on the end of the sleeve 25 is secured by means of rivets 27 to the flanged disc 26 which closes the other pulley half. This pulley half is shown at 28 and is likewise provided with a spiral shear line as previously explained. These spiral shear lines begin at the smallest diameter of the conical parts and increase in diameter outwardly to form spiral bands which may interleave and overlap as indicated in Figure 3. The flanged discs 22 and 26 are secured in the respective pulley parts in any suitable manner, as by means of screws, rivets, welding, threads, or the like.

Secured to and concentrically with the flanged disc 26 is an internal gear 30 in the form of a ring which is secured to the disc 26 by means of the rivets 29. The rivets 29 also serve to secure in an overlying position with respect to the ring gear 30 a ring 29' which has a central opening of a smaller diameter than the opening in the ring gear, as is clear from Figure 3. Mounted between the disc 26 and the ring 29' is a gear carrier and filler piece 31. This member is clearly illustrated in Figure 11. It is in the form of a disc having a central opening 31" and a key slot 31$^a$. It is likewise provided with a pair of diametrically aligned circular recesses 31' in which the gears lie. This disc is provided with a series of threaded holes 31$^b$ and a radially extending internal threaded passage 31$^c$ opposite the key slot 31$^a$.

The disc 31 fits on the shaft 2 (see Figure 7) so that the key 14 engages the slot 31$^a$. A set screw 70 lies in the radial passage 31$^c$ so that the end thereof engages the shallow recess 15 in the shaft 2 (see Figure 5). Thus the disc 31 is keyed to the shaft 2 for rotation with it. When these parts are secured together in this manner the adjacent portions of the recesses 31' are aligned with the slots 13 in the shaft 2 (see particularly Figure 5). Lying in the recesses 31' are the planetary gears 33 which are journaled on shafts 32 mounted in the disc 31 and in a cover disc 34 which lies in the central opening in the ring 29' and is secured to the disc 31 by means of screws 71 (see Figure 5), which engage the threaded holes 31$^b$ in the disc 31 (see Figure 11).

Mounted in the counterbore 10 of the shaft 2 is a clutch mechanism including a shaft 36 (see Figure 13) which is slidably mounted in a pair of sleeves 40 and 43. Sleeve 40 is provided with a flanged end 41 and a clutch part 39. Sleeve 43 is provided with a flanged end 44 and a clutch part 42. Mounted between these sleeves is a helical gear 35 which is provided on its ends with the clutch parts 37 and 38. The gear 35 is secured to (tight shrink fit) the rod 36. This structure is mounted in a sleeve 45 (see Figure 9) which is provided with two pairs of holes 46 and a pair of oppositely disposed slots 47. The slots 47 are positioned to expose the gear 35 and are aligned with the slots 13 of the shaft and the recesses 31' (see Figure 5).

Interposed between the inner end of the rod 36 and the bottom of the passage in the sleeve 40 is a spring 50. The sleeves 43 and 40 are secured in the sleeve 45 by means of pins 49 and 48 respectively. The tops of the pins 49 are flush with the outer surface of the sleeve 45 while the pins 48 project above that sleeve so as to lie in the slots 12 of the shaft (see Figure 3). Thus the clutch mechanism is a unit, as will be seen, capable of axial movement in the counterbore of shaft 2. A heavy spring 52 lies between this unit and the bottom of the counterbore 10 and is seated on a suitably shaped centering button 51 and the projecting end 41' of the sleeve 40 (see Figure 13). The helical gear 35 meshes with the planetary gears 33 (see Figure 5). A V-belt 53 extends between the two pulleys and lies in the grooves formed by the pulley parts 24 and 28 and 24' and 28' (see Figure 3).

Secured on opposite sides of the casing I are the U-shaped pivot blocks 54 and 54' in which are pivotally supported the double ended levers 55 and 55' on the pivot pins 56 and 56', respectively. In Figure 10 is illustrated the construction of the double ended levers. At one end of each is a passage in which the ends of the shafts or pins 36 and 36' lie. In the other ends of these levers are passages in which the buttons 58 and 58' lie. Also pivoted on the pivot pins 56 and 56' are the double ended spring arms 57 and 57'. Each of these spring arms engages respectively the adjacent pins 36 and 36' and buttons 58 and 58', respectively, as shown in Figure 10.

As is clear from Figure 4, the sides of the housing I are provided with aligned openings through which cam 57 may project. This cam is pinned to a vertical stud 60 rotatably mounted in a rotatable bearing sleeve 62. This bearing sleeve is journaled in a suitable casing secured to the top of the housing. The upper end of the stud 60 is provided with threads 61 which engage threads in a passage in the sleeve 62. Secured to the upper end of the stud, by means of a screw, is a small arm 64 which may rotate in a recess in the end of the sleeve 62. A fixed stop pin 65 is secured in this recess as shown. Secured to the sleeve 62 in any suitable manner is an operating hand wheel 63. The cam 59 is capable of rotation and of limited vertical movement, as will be described later, so that it is either in line with or below the projecting buttons 58 and 58'.

Before describing the operation of this device, it will first be noted that the pulley parts have been adjusted to one extreme of their position, as illustrated in Figure 3, so that the belt 53 is at the bottom of the groove of the right hand pulley and at the top of the groove of the left hand pulley. The pulley parts of the right hand pulley are axially separated a maximum amount, while the pulley parts of the left hand pulley have approached to their nearest position. Thus the former is interleaved a minimum amount while the latter is interleaved a maximum amount. The parts when assembled are arranged so that the mechanism is adjusted to place the pulley parts in this position. It will be assumed that the power input is applied to shaft 2 while the power output is applied to shaft 2'.

In order to increase the speed of rotation of shaft 2' it is necessary to separate the pulley parts 24' and 28' the desired amount while moving the pulley parts 24 and 28 closer together a corresponding amount. It will be assumed that in moving the pulley parts to the position shown in Figure 3, that the handwheel was rotated in a clockwise direction when viewed from above, Figure 2.

In order to effect operation of this device from the position shown handwheel 63 is rotated in a counterclockwise direction causing pin 65 to drive small arm 64 (as shown in Figure 2). In this position the cam 59 is in its lowest axial position below pins 58 and 58', thereby leaving them as shown in Figure 3 in their inward position. Rotation of said hand wheel in this direction causes the cam to turn with it while engaged with the adjacent ends of the levers 55 and 55' directly, below the pins 58 and 58'. The cam is shaped (Figure 3) so that the diametrically aligned high parts cause two vibrations of the levers 55 and 55' to one complete turn of the handwheel. This movement of the levers caused by their engagement with the cam rises is reactionary against the spherical end surfaces of sleeves 43 and 43', causing them and all parts tied thereto to move inwardly into the counterbores of the shafts 2 and 2' compressing the springs 52.

Figure 15:
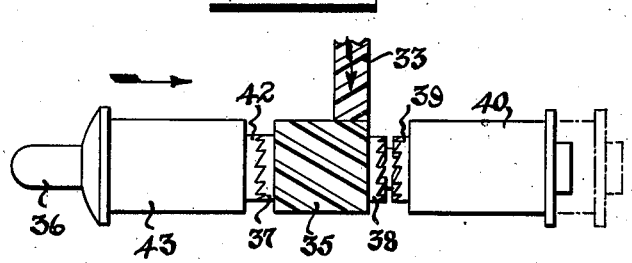
Figure 16:
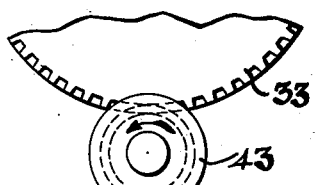
Figure 17:
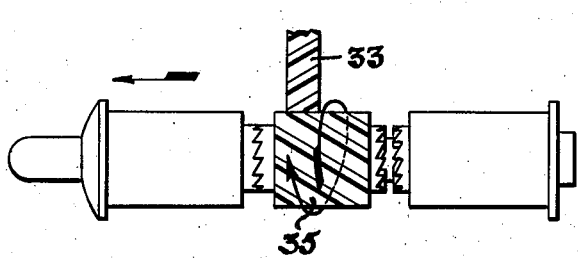
Figure 18:
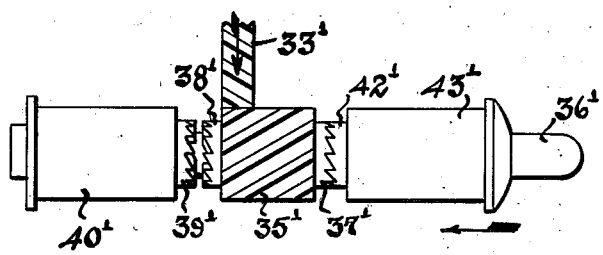
Figure 19:
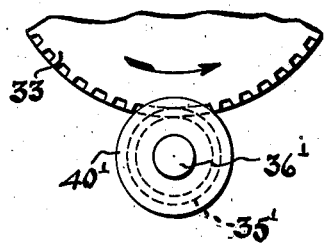
Figure 20:
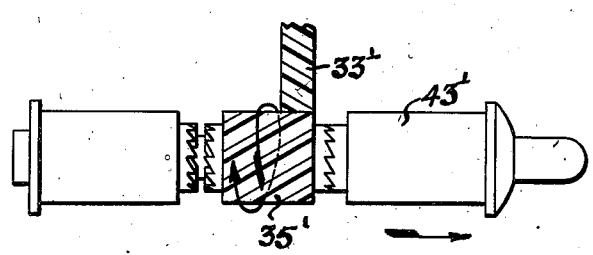
Figure 21:
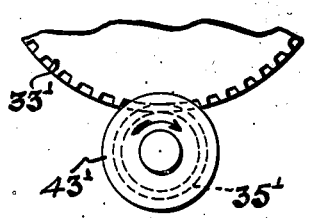

During the inward stroke of these unit clutch assemblies under the conditions listed in the foregoing the clutch elements 37 and 37' of the helical pinions 35 and 35' are held in engagement with the clutch elements 42 and 42' of the sleeves 43 and 43' by the reaction of spring 50 due to the fact that spring arms 57 and 57' are not operative (Figures 15 and 18).

The teeth of the pinion 35 used in the clutch assembly employed in the R. H. pulley assembly (Figure 3) are of R. H. helix angle and due to its clutch element 37 engagement with element 42 of sleeve 43 it is unable to revolve in a clockwise direction (Figure 3) relative to shaft 2 thereby causing the two planet gears 33 to index one tooth in a clockwise direction (treating pulley assembly from its mechanism side).

The teeth of the pinion employed in the clutch unit of the L. H. pulley assembly are of L. H. helix angle and due to the clutch teeth operation of 37' and 42' the pinion 35' cannot turn with relation to shaft 2' during the inward stroke of the clutch assembly, thereby causing by tooth angle the planet pinions 33' (not shown) to turn in a counter-clockwise direction (treating the L. H. pulley assembly Figure 3 from its mechanism side).

The pivot pins 32 on which the planet gears 33 are journaled are unable to move around circumferentially with respect to shafts 2 and 2' and therefore the movement of the planet gears causes relative movement of the ring gears 30 which in turn causes relative movement of the pulley halves 28 and 28' with respect to the pulley halves 24 and 24', respectively. The threaded engagement between the sleeves 21 and 25 therefore causes a small movement of the pulley half 24 toward 28 and a small movement of 24' away from pulley half 28'. The key 11, of course, causes rotation of the pulley half 24 with the shaft 2, while permitting axial movement therealong. At the same time, of course, through a similar action, but in an opposite sense, the pulley half 24' moves away from the pulley half 28'. Thus the radius of the groove in the right hand pulley increases, while that in the left hand pulley decreases. This movement is a small one but continues rapidly as hand wheel 63 and cam 59 are spun around so that by small increments the pulley parts are axially adjusted the desired amount.

The above description has been given as though the parts were at a standstill, but upon consideration it will be seen that the same action goes on even though the parts are revolving at any speed, the motion of the ring gear 30 being effected with respect to the gears 33 and the disc 31 in which they are mounted even though all these parts are revolving as a unit. It is the relative movement between the ring gear 30 and the gears 33 which effects this adjustment. By continued counter-clockwise rotation of the cam 59, the right hand pulley parts can be moved closely together, while the left hand pulley parts are moved apart the maximum amount. When it is desired to reverse this operation, the hand wheel 63 is rotated in a clockwise direction (Figure 2).

As soon as this occurs pin 65 moves around from the position shown in Figure 2 to the other side of the small arm 64. At the same time sleeve 62 revolves, but being fixed against axial movement it causes the cam 59 to move upwardly by reason of its engagement with the threads 61. Thus for the first revolution of the hand wheel cam 59 does not revolve but it does rise so that it is aligned with the pins 58 and 58'. As soon as pin 65 engages the small arm 64 the cam 59 revolves with the sleeve 62. The cam is shaped as is clearly shown in Figure 3, so that the diametrically aligned high parts simultaneously move the pins 58 and 58' outwardly for their full movement. This movement is transmitted through the spring arms 57 and 57' to the pins 36 and 36' causing those pins to move inwardly so that the clutch parts 38 and 39 (Figure 23) as do the clutch parts 38' and 39' (Figure 26) engage, and the clutch parts 37 and 42 and 37' and 42' disengage. Under the movement of pins 36 and 36', springs 50 are compressed. As this movement is completed the adjacent ends of the arms 55 and 55' are engaged by the cam 59 causing those arms to move with the result that the opposite ends bearing on the sleeves 43 and 43' move them, and all the parts tied thereto, inwardly into the counterbores 10 of the shafts, compressing the springs 52 (Figure 6).

Figure 22:
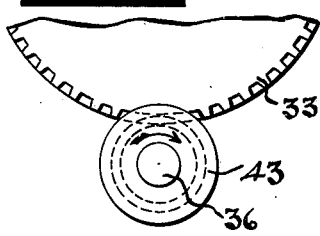
Figure 23:
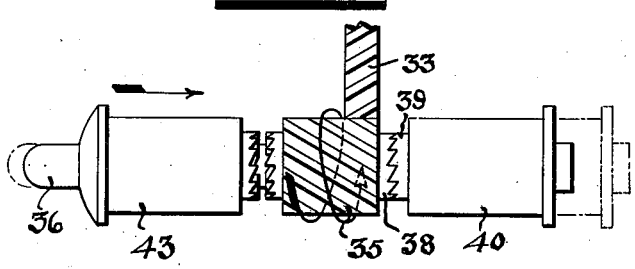
Figure 24:
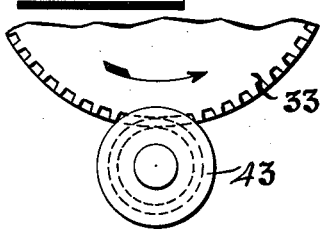
Figure 25:
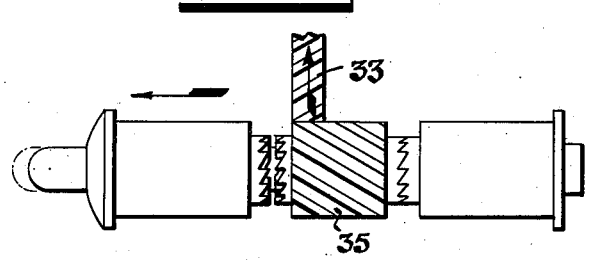
Figure 26:
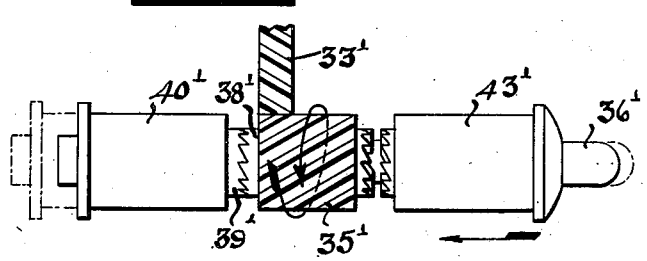
Figure 27:
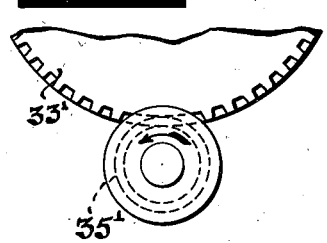
Figure 28:
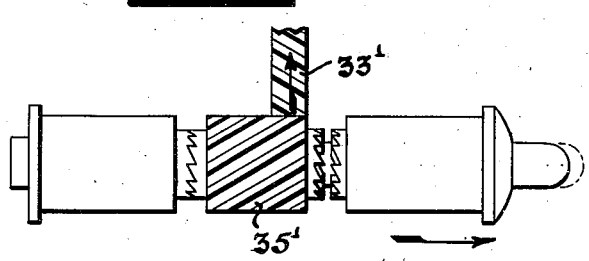
Figure 29:
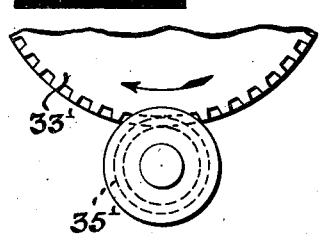

As the clutch assembly moves from the position shown in Figure 23 to the dotted position indicated at the right hand end of the figure, pinion 35 turns in a clockwise direction as indicated in Figure 22, ratcheting the clutch members 38 and 39. As arm 55 moves back the clutch assembly is free to be returned by the compressed spring 52 (Figure 6) and on its outward stroke the pinion 35 drives the planet gears 33 in a counter-clockwise direction as indicated in Figures 24 and 25. This causes a relative decrease in the diameter of the groove of the right hand pulley assembly (Figure 3). A similar action occurs in the left hand pulley assembly of Figure 3 as diagrammatically indicated at Figures 26 to 29 inclusive. On the inward stroke of the clutch assembly after positioning the pin 36', as indicated in Figure 26, the pinion 35 ratchets on the clutch members 38' and 39' in a counter-clockwise direction (see Figure 27). On the return of the clutch under the action of its associated spring 52 the pinion 35' causes the planet gears 33' to rotate in a clockwise direction as indicated in Figures 28 and 29. Thus there is caused a relative increase in the diameter of the pulley groove of the left hand pulley assembly (Figure 3). Hence for the reverse operation so to speak, as the pulley groove of the right hand belt assembly decreases in diameter the pulley groove of the left hand pulley assembly increases in diameter.

From the above description it will be apparent to those skilled in the art that applicant has devised a mechanism embodying certain principles of construction and operation which may be built into specifically different mechanical structures without departing from the novel scope of the subject matter herein disclosed. I do not, therefore, desire to be strictly limited to the single embodiment herein disclosed to illustrate the invention, but rather to the scope of the claims granted me.

What is claimed is:

1. In a variable speed power transmission a driving pulley, a driven pulley, each of said pulleys comprising two parts relatively movable in an axial direction by reason of relative circumferential motion, a belt connecting said pulleys, and means for simultaneously causing relative circumferential movement between the pulley parts to change the belt diameters of said pulleys.

2. In a variable speed power transmission a driving pulley, a driven pulley, each of said pulleys comprising two parts relatively movable in an axial direction by reason of relative circumferential motion, a belt connecting said pulleys, and means for simultaneously causing relative circumferential movement between the pulley parts to change the belt diameters of said pulleys while the transmission is in operation.

3. In a variable speed power transmission a driving V-pulley, a driven V-pulley, each of said pulleys comprising a pair of relatively movable parts, a V-belt connecting said pulleys, and means for simultaneously causing relative axial and circumferential movement between the pulley parts to increase the belt diameter of one and decrease the belt diameter of the other.

4. In a variable speed power transmission a driving V-pulley, a driven V-pulley, each of said pulleys comprising a pair of relatively movable parts, a V-belt connecting said pulleys, and means for imparting relative movement between the pairs of pulley parts by a plurality of uniform successive increments of rotary motion to increase the belt diameter of one pulley while decreasing the belt diameter of the other.

5. In a variable speed power transmission a driving V-pulley, a driven V-pulley, each of said pulleys comprising a pair of parts capable of relative axial movement caused by relative circumferential movement, a V-belt connecting said pulleys, and means for simultaneously imparting successive increments of circumferential movement to the respective pulley parts to decrease the belt diameter of one pulley while increasing the belt diameter of the other pulley.

6. In a variable speed power transmission a driving V-pulley, a driven V-pulley, each of said pulleys comprising a pair of parts capable of relative circumferential movement to give them relative axial movement, a V-belt connecting said pulleys, and manually operated means for simultaneously imparting successive increments of circumferential movement to the respective pulley parts to decrease the belt diameter of one pulley while increasing the belt diameter of the other pulley.

7. In a variable speed power transmission a driving shaft and a driven shaft, a V-pulley mounted on each shaft, each pulley comprising a pair of parts relatively movable in an axial direction as the result of relative circumferential movement, one part of each pulley being secured to its respective shaft, a V-belt connecting said pulleys, and means for causing circumferential motion in successive increments to the other pulley part of each pulley to simultaneously increase the belt diameter of one pulley while decreasing the belt diameter of the other.

8. In a variable speed power transmission a driving shaft and a driven shaft, a V-pulley mounted on each shaft, each pulley comprising a pair of parts relatively movable in an axial direction, one part of each pulley being secured to its respective shaft, the other pulley part of each pulley threadedly engaging its associated shaft, a V-belt connecting said pulleys, and means for causing axial movement through the threaded engagement of the last pulley parts with their associated shafts to simultaneously change the belt diameters in opposite senses.

9. In a variable speed power transmission a driving and a driven shaft, two part pulleys mounted on said shafts respectively, one part of each pulley being secured to its associated shaft, the other part of each pulley being capable of axial movement as the result of circumferential movement, a V-belt connecting said pulleys, and means for imparting circumferential movement to said last pulley parts to cause a simultaneous change in the belt diameters of each of said pulleys.

10. In a variable speed power transmission a driving and a driven shaft, two part pulleys mounted on said shafts respectively, one part of each pulley being secured to its associated shaft, the other part of each pulley being capable of axial and circumferential movement, a V-belt connecting said pulleys, clutch and gear mechanism for causing circumferential movement of said last pulley parts to cause axial movement thereof, and means for operating said clutch and gear mechanism.

11. In a variable speed power transmission a driving and a driven shaft, two part pulleys mounted on said shafts respectively, one part of each pulley being secured to its associated shaft, the other part of each pulley being capable of axial and circumferential movement, a V-belt connecting said pulleys, clutch and gear mechanism for causing circumferential movement of said last pulley parts to produce axial movement thereof, and means for operating said clutch and gear mechanism while said shafts are revolving.

12. In a variable speed power transmission a driving and a driven shaft, two part pulleys mounted on said shafts respectively, one part of each pulley being secured to its associated shaft, the other part of each pulley being capable of axial and circumferential movement, a V-belt connecting said pulleys, clutch and gear mechanism for causing circumferential movement of said last pulley parts to move them axially, and means for operating said clutch and gear mechanism to impart successive increments of circumferential motion to said last pulley parts.

13. In a variable speed power transmission a driving and a driven shaft, two part pulleys mounted on said shafts respectively, one part of each pulley being secured to its associated shaft, the other part of each pulley being capable of axial and circumferential movement, a V-belt connecting said pulleys, clutch and gear mechanism for causing circumferential movement of said last pulley parts to move them axially, and cam operated means for operating said clutch and gear mechanism to impart successive increments of circumferential motion to said last pulley parts.

14. In a variable speed power transmission a driving and a driven shaft, a two part V-pulley mounted on each shaft respectively, one part of each pulley being secured to its associated shaft, the other part of each pulley being axially and circumferentially movable on its associated shaft, each of the pulley parts being spirally sheared, a V-belt connecting said pulleys, and means for effecting circumferential and axial movement of said last pulley parts to cause the sheared parts to interleave whereby the belt diameters of said pulleys are changed in opposite senses.

15. In a variable speed power transmission a driving and a driven shaft, two part V-pulleys mounted on each of said shafts respectively, a V-belt connecting said pulleys, one part of each pulley being secured to its associated shaft, the other part of each pulley being axially and circumferentially movable on its associated shaft, and means for effecting circumferential movement of said last pulley parts in either direction to simultaneously move them axially so as to increase the belt diameter of one pulley and decrease the belt diameter of the other pulley, or increase the belt diameter of the last mentioned pulley while decreasing the belt diameter of the first mentioned pulley.

16. In a variable speed power transmission a driving shaft having a two part pulley mounted thereon, a driven shaft having a two part pulley mounted thereon, one part of each pulley being attached to its associated shaft and the other part being threadedly mounted thereon for axial movement on the shaft as the result of rotary movement, means for causing simultaneous rotary movement of the movable parts of said pulleys in opposite directions, and a belt connecting said pulleys.

17. In a variable speed power transmission a driving shaft having a two part pulley mounted thereon, a driven shaft having a two part pulley mounted thereon, one part of each pulley being attached to its associated shaft and the other part being threadedly mounted thereon for axial movement on the shaft as the result of rotary movement, means for intermittently rotating the movable parts of said pulleys in opposite directions simultaneously, and a belt connecting said pulleys.

18. In a variable speed power transmission a driving shaft having a two part pulley mounted thereon, a driven shaft having a two part pulley mounted thereon, one part of each pulley being attached to its associated shaft and the other part being threadedly mounted thereon for axial movement on the shaft as the result of rotary movement, the parts of each of said pulleys being sheared on a spiral line so that the respective pulley parts may interleave as they move axially as the result of relative rotational movement, means for causing relative rotational movement of the respective pulley parts, and a belt connecting the pulleys.

PRESTON WHITCOMB.